FORAGE UNLOADING MECHANISM FOR SILOS
Original Filed Oct. 3, 1961 2 Sheets-Sheet 1
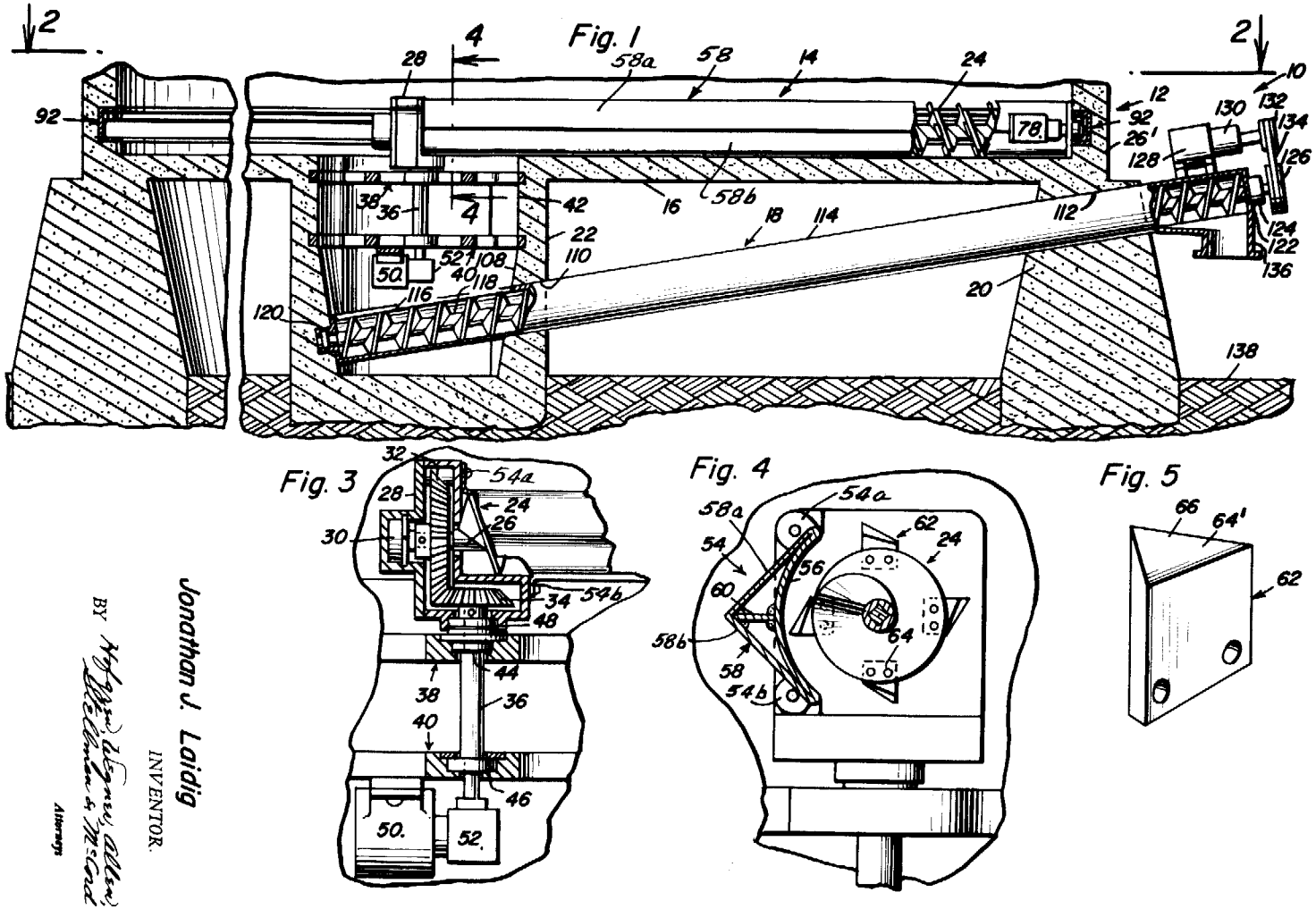
Jonathan J. Laidig
INVENTOR.
BY Hofgren, Wegner, Allen, Stellman & McCord
Attorneys FORAGE UNLOADING MECHANISM FOR SILOS
Original Filed Oct. 3, 1961 2 Sheets-Sheet 2
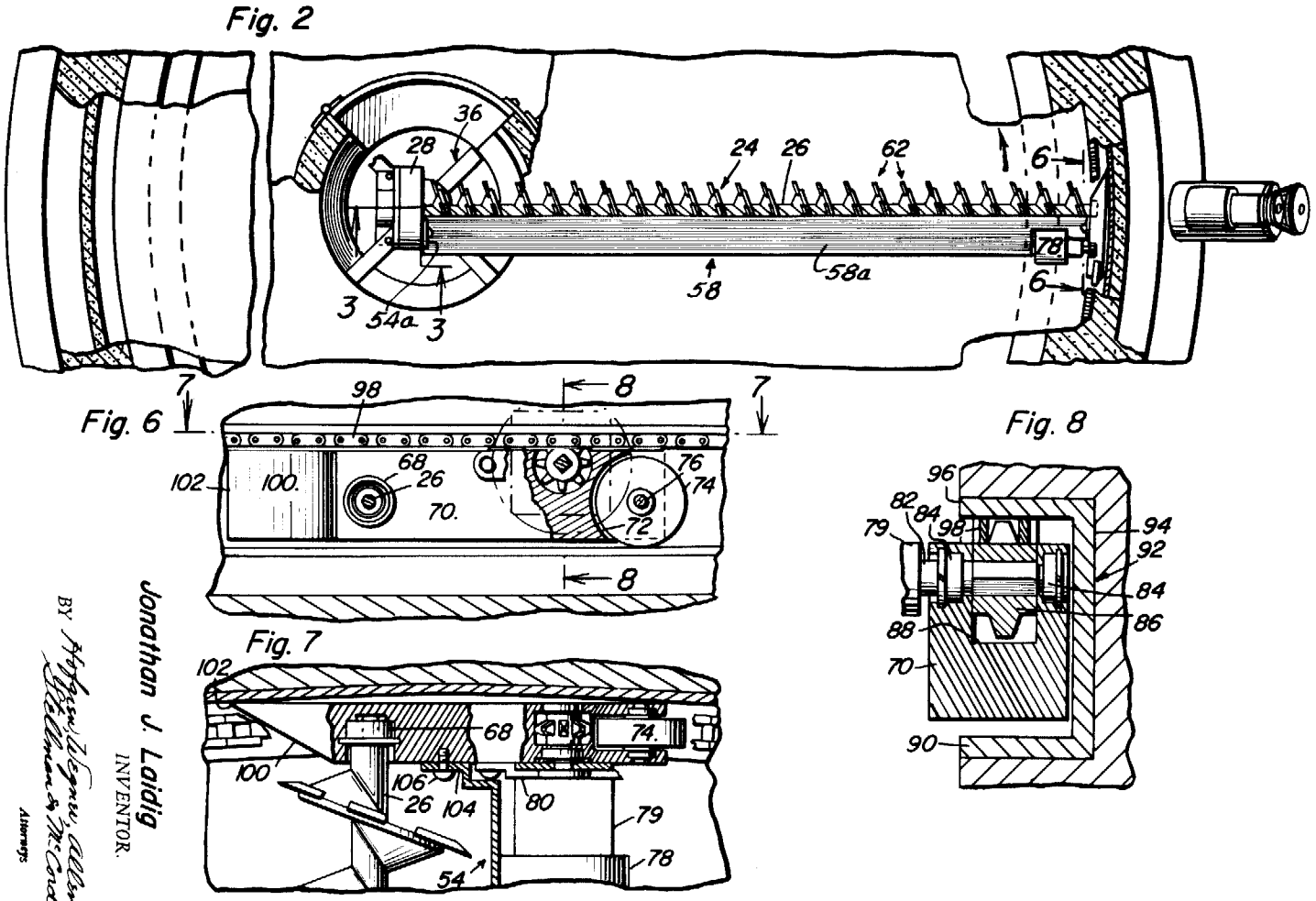
Jonathan J. Laidig
INVENTOR.
BY Hofgren, Wegner, Allen, Stellman & McCord
Attorneys United States Patent Office Re. 25,863
Reissued Sept. 21, 1965

25,863

FORAGE UNLOADING MECHANISM FOR SILOS

Jonathan J. Laidig, Rte. 1, 14450 Madison Road, Mishawaka, Ind.

Original No. 3,121,501, dated Feb. 18, 1964, Ser. No. 142,584, Oct. 3, 1961. Application for reissue July 28, 1964, Ser. No. 398,821
26 Claims. (Cl. 214—17)

Matter enclosed in heavy brackets [ ] appears in the original patent but forms no part of this reissue specification; matter printed in italics indicates the additions made by reissue.

This invention relates to unloading and conveying devices, and particularly to devices for unloading feed from the bottom of silos and conveying the feed to the exterior of the silos.

Accordingly it is a primary object of the invention to disclose a device for efficiently unloading feed forcibly by power means from silos and conveying the feed to the exterior of the silos.

It is another object of the invention to provide an unloading device for silos which is power driven in such a manner that the unloading device is forced by a positive means in a circular motion around the bottom of the silo whereby it forcibly cuts or chews particles of feed from the bottom of the feed stack in the silo, conveys this feed to the center of the silo whereupon the feed drops downwardly into a conveyor which carries the feed to the exterior of the silo.

It is another object of the invention to provide a device for unloading feed from silos in such a manner that layers of feed are removed successively completely across the floor of the silo whereby no portions of feed are left at the edge of the silo floor for supporting columns of feed thereabove. This is of particular importance in the winter time when conventional conveyors commonly leave some feed at the side of the silo which becomes frozen and supports the feed thereabove so as to prevent it from dropping downwardly into the unloading mechanism. This obviously causes loss of efficiency or complete inoperativeness of the unloader.

It is another object of the invention to provide a novel and more efficient means for positively forcing a silo unloading mechanism in a circular path around the bottom of a silo.

It is another object of the invention to provide a silo forage unloading mechanism which has power driven means thereon for positively chopping and cutting up the forage for more efficient removal.

It is still another object of the invention to provide a silo forage unloading device which is self-cleaning so as to prevent locking and fouling of its mechanical parts.

It is another object of the invention to provide a silo unloading device which is relatively simple and efficient in design, economical to manufacture, and is durable and highly reliable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical cross sectional view through the bottom portion of a silo and showing my invention installed therein;

FIGURE 2 is a horizontal sectional view taken substantially on the plane of line 2—2 of FIGURE 1;

FIGURE 3 is a cross sectional view on an enlarged scale taken substantially upon the plane of line 3—3 in FIGURE 2;

FIGURE 4 is a vertical cross section view on an enlarged scale taken substantially on the plane of line 4—4 in FIGURE 1;

FIGURE 5 is an enlarged perspective view of one of the conveyor cutter elements;

FIGURE 6 is a vertical cross sectional view on an enlarged scale taken substantially on the plane of line 6—6 of FIGURE 2;

FIGURE 7 is an enlarged horizontal sectional view taken substantially on the plane of line 7—7 of FIGURE 6; and FIGURE 8 is an enlarged vertical cross sectional view taken substantially on the plane of line 8—8 in FIGURE 6.

Referring to the drawings, and particularly to FIGURE 1, it can be seen that my forage loader 10 is mounted at the bottom of a silo 12 and comprises a sweeping auger 14 mounted just above the floor 16 of the silo and a main discharge auger 18 located below the floor and secured at one end in the circular foundation wall 20 of the silo and at the other end in the center post 22 which supports the central portion of the silo floor 16.

The sweeping auger 14 comprises an auger 24 extending radially of the silo from the center of the center post 22 to the circular wall 26' of the silo 12. The auger 24 includes a spiral rib concentric around and secured to a central shaft 26. As shown more clearly in FIGURE 3, the radially inner end of the shaft 26 extends into an L-shaped gear housing 28 and is journalled in an anti-friction bearing 30 secured in a side wall of the housing. The gear housing 28 encloses two rotatable and mating bevel gears 32 and 34. The larger gear 32 is secured to the end of the shaft 26, and the smaller gear 34 is secured to the upper end of a vertically extending drive shaft 36. Two spider assemblies 38 and 40 each comprising four radially extending arms are secured within a circular chamber 42 within the center post 22. The central portions of these spiders have recesses in which are secured anti-friction bearings 44 and 46 for rotatably journalling the drive shaft 36. The bottom of the gear housing 28 has a downwardly extending annular flange formed thereon which receives a thrust bearing 48 for rotatably journalling the housing 28 on the upper surface of the spider 38, *so that the housing provides a rotatable central support.* An electric motor 50 is secured in a conventional manner to the bottom surface of the spider 40 and the housing thereof supports a transmission 52 which is connected to and drives the drive shaft 36 at a reduced speed.

The back side of the auger 24 is enclosed by a cover assembly 54 *having flanges 54a and 54b by means of which it is secured to the central support.* The cover assembly 54 comprises a part cylindrical *forwardly concave* inner wall 56. The outer edges of the inner wall are secured to the outer edges of an angle member 58 *to form a hollow structural member,* and a central portion of the wall 56 is connected to the angle member by a rib 60. *An upper leg 58a of the angle member provides a top wall that extends downwardly and rearwardly; while a lower leg 58b of said member extends upwardly and rearwardly.*

The outer edges of the auger 24 have secured thereto a plurality of knives 62 by means of rivets 64 extending through aligned bores in the knives and the auger. Shown in FIGURE 5, each of the knives 62 is preferably triangular in cross section and has a sloping upper surface 64' which intersects with a front surface to form a relatively sharp cutting edge 66.

The radially outer end of shaft 26 is rotatably journalled and supported in a plow 70 by means of an anti-friction bearing 68 located in a recess in the inner side wall of the plow. The rear end of the plow has an arcuate recess 72 formed therein which receives a support wheel 74 journalled on an axle 76 whose ends extend through the wheel and are secured to the plow 70.

An electric motor housing 78 is secured to the inner side wall of the plow by means of a bracket 80. The motor housing 78 is also supported within a recess in the outer end of the cover assembly 54. The drive shaft 82 of the electric motor is journalled in the plow 70 by means of anti-friction bearings 84. The central portion of the shaft 82 is rectangular and drivingly connected to a sprocket 86 which is rotatable in the recess 88 in the upper portion of the plow.

The plow 70 is supported by means of the wheel 74 on a rail 90 which comprises the lower leg of a channel-shaped track 92. The track 92 is supported within an annular recess 94 formed within the inside of the silo wall. The upper leg 96 of the track 92 has secured at its underside an annular roller chain 98 which extends 360° around the silo wall with the rail 92; *and the chain 98 and upper leg 96 cooperate to provide a rack-like drive track member.* The sprocket 86 mates with the roller chain 98 so that when the sprocket is driven by the motor 78, the plow and outer end of the auger 24 are forced in a counter-clockwise direction around the silo wall as viewed in FIGURE 2 and as shown by the arrow. The motor 78 is preferably connected to the sprocket 86 by a reduction gear transmission 79 so as to increase torque produced at the sprocket 86 and to decrease the rotational speed of the auger 24 about the shaft 36.

The forward portion of the plow has a triangular *blade* portion 100 terminating in a vertical edge 102. The triangular portion 100 acts as a plow and wedge and forces all foreign material out of the track 92.

As shown in FIGURE 7, the radial outer end of the cover assembly 54 is flanged at 104. The flange 104 is secured to the plow 70 by means of a bolt 106. *Thus, the cover assembly forms a rotatable sweep arm, the outer end of which is adjacent the silo wall 26'.*

As shown in FIGURE 1, the circular chamber 42 terminates in a frusto-conical well 108 below the spider assemblies 38 and 40. The side walls of the wall 108 and an upper portion of the foundation 20 have aligned sloping bores 110 and 112 formed therein respectively. Mounted within these bores is a tubular housing 114 for the auger assembly 18. At least the upper half of the housing 114 within the well 108 is removed so as to expose the discharge auger 116. The auger 116 is also a spiral member mounted on a shaft 118, the lower end of which is journalled at 120 in the side of the well 108.

The outer end of the housing 114 is closed by a circular wall 122 through which extends the outer end of the shaft 118. The shaft is journalled to the wall 122 by means of an antifriction bearing 124. The outer end of the shaft 118 has affixed thereon a pulley 126. A motor 128 and a reduction gearing 130 are mounted on the upper surface of the outer end of the housing 114. Reduction gearing 130 is connected to and drives a relatively small pulley 132 which drives the larger pulley 124 by means of a belt 134. The extreme outer end of the housing 114 is in communication with an outlet nozzle 136 which is spaced above and directed toward the ground 138.

In operation the silo 12 is filled with forage to a relatively great height. The weight of the forage compacts the bottom layers thereof and makes it difficult to remove. However, with my invention, to remove the forage from the silo it is only necessary to energize the motors 78, 50 and 128. The motor 78 by means of the transmission 79, sprocket 86 and roller chain 98 drives the auger 24 in a clockwise direction around the silo. At the same time the motor 50 by means of the transmission 52, shaft 36 and gear mechanism 28 drives the auger 24 in a rotational direction about its own longitudinal axis. As the auger 24 moves over the floor 16 of the silo, the rotating knives 62 chop the forage into small pieces whereby it enters the spiral recess in the auger 24 and is forced radially inwardly by the rotation of the auger about its own longitudinal axis into the circular chamber 42. The forage then falls down through the spiders 38 and 40 onto the main discharge auger 18. The discharge auger 18 then removes the forage from the well 108 through the tube 114 whereupon it is discharged from the nozzle 136 into any desirable receptacle, not shown.

Normally, forage would tend to clog the inside chamber of the track 92. However, the angled surface 100 of the plow effectively forces all forage and foreign particles from the inside of the track thereby keeping it unobstructed. Also, it is to be noted that the layer of forage equal in thickness to the height of the auger 24 is completely removed from wall to wall of the silo during each revolution of the auger about its vertical axis. This insures that no forage or foreign material will be left at the edge of the silo for supporting its weight, particularly in the winter time when the forage freezes. Normally, the auger 24 rotates about its longitudinal axis 100 r.p.m. and about its vertical axis once every 12 to 15 minutes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a generally cylindrical silo including a floor having a centrally located opening therein, and an unloader for the silo comprising an inwardly opening annular, channel-shaped track mounted circumferentially in the silo flush with the inner periphery thereof and adjacent the floor, a plow including at least one supporting wheel operable in the track, a radial sweep auger adjacent the floor and including an inner end pivotally secured thereto over the opening for discharging ensilage through said opening, said sweep auger further including an outer end rotatably secured to the plow and carried thereby, means for propelling the plow around the track for displacing ensilage therefrom into the path of the sweep auger, and means for rotating said sweep auger for conveying the ensilage to the opening.

2. In combination, a generally cylindrical silo including a floor having a centrally located opening therein, and an unloader for the silo comprising an inwardly opening annular, channel-shaped track mounted circumferentially in the silo flush with the inner periphery thereof and adjacent the floor, a plow including at least one supporting wheel operable in the track, a radial sweep auger adjacent the floor and including an inner end pivotally secured thereto over the opening for discharging ensilage through said opening, said sweep auger further including an outer end rotatably secured to the plow and carried thereby, means for propelling the plow around the track for displacing ensilage therefrom into the path of the sweep auger, and means for rotating said sweep auger for conveying the ensilage to the opening, said sweep auger comprising a rotary shaft having an end portion journalled in the plow, a spiral rib on said shaft, and an elongated generally concave housing adjacent the rib in parallelism therewith and having one end secured on the plow and carried thereby.

3. The combination of claim 2, the first-named means comprising an endless sprocket chain secured circumferentially in the upper portion of the track, a sprocket gear rotatably mounted on the plow and engaged with said chain, and means for actuating said sprocket gear.

4. The combination of claim 3, the last-named means including an electric motor mounted on the housing and operatively connected to the sprocket gear.

5. The combination of claim 4, said plow being elongated and including a rear portion having recesses therein accommodating the supporting wheel and the sprocket gear.

6. The combination of claim 5, said plow further including a laterally beveled forward end portion for camming the ensilage in the track toward the sweep auger.

*7. In a silo having a generally cylindrical upright wall and a floor with a central opening, unloading mechanism comprising: a rotatable central support above the opening; a radial sweep arm on said support, said arm having an outer end adjacent the silo wall; a plow secured to and supporting the outer end of the sweep arm and cooperating with the central support to position the sweep arm above the floor, said plow having a blade portion spaced circumferentially from the sweep arm; conveyor means that has an inner end carried in the central support and an outer end carried in the plow adjacent the blade portion; cutter means mounted on the conveyor means; means for rotating the sweep arm with the plow blade portion leading, said blade portion being adapted to displace material generally toward the conveyor means as the arm is rotated; and means for driving the conveyor means to cause the cutter means to cut material in the path of the conveyor means and to cause the conveyor means to move material cut by the cutter means and material displaced by the plow to deliver all such material to the central opening.*

*8. The unloading mechanism of claim 7 which includes a supporting track member concentric with the silo wall, and in which the plow rides on said track member and displaces material from it.*

*9. The unloading mechaism of claim 8 which includes a drive track member spaced above the supporting track member, and in which the drive means for propelling the plow includes a drive wheel rotatably engaging the drive track member.*

*10. The unloading mechanism of claim 9 in which the drive track member is racklike, and the drive wheel has radial teeth engaging the racklike track member.*

*11. The unloading mechanism of claim 7 in which the conveyor means is an auger and the cutting means comprises knives which extend generally radially with respect to the shaft and project outside the auger, said knives having cutting edges which are spaced from the floor.*

*12. The unloading mechanism of claim 7 in which the conveyor means is an auger that has a shaft between the plow blade and the sweep arm, the sweep arm includes an arcuate wall that trails the auger and is concave with respect thereto, and a top plate which is inclined downwardly and rearwardly from the top of the wall.*

*13. In a silo having a generally cylindrical upright wall and a floor with a central opening, unloading mechanism comprising: a radial sweep auger adjacent the floor, said auger having an inner end over the opening and having an outer end immediately adjacent said upright wall; a plow in which the outer end of the auger is journalled, said plow being between the auger and at least a part of said wall; means for propelling the plow along the wall for displacing ensilage into the path of the sweep auger; and means for rotating said sweep auger for conveying the ensilage to the opening.*

*14. The unloading mechanism of claim 13 which includes a supporting track member concentric with the silo wall, and in which the plow rides on said supporting track member.*

*15. The unloading mechanism of claim 14 which includes an upper track member that overhangs the supporting track member.*

*16. The unloading mechanism of claim 15 in which the upper track member is racklike, and the drive means for propelling the plow includes a wheel that has radial teeth engaging said racklike track member.*

*17. In a solo having a generally cylindrical upright wall and a floor with a central opening, unloading mechanism comprising: a rotatable central support above the opening; means for rotating said support in a predetermined direction; a radial sweep arm on said support above the floor, said arm including a structural member that is fixedly secured to said central support and extends continuously to a point adjacent the silo wall, said arm having a forward wall integral with the structural member which faces generally in said predetermined direction and has an upper portion that overhangs the central portion of said wall; conveyor means having an inner end in the central support and an outer end at the outer end of the sweep arm, said conveyor means having its rear portion beneath the overhanging upper margin of the forward wall; means supporting the outer end of the structural member of the sweep arm and the outer end of the conveyor means so that the bottom portion of the conveyor means is in close, substantially parallel relationship to the floor; and means for driving the conveyor means to move material to the central opening.*

*18. The unloading mechanism of claim 17 in which the structural member includes a top wall which extends downwardly and rearwardly from the upper margin of the forward wall.*

*19. The unloading mechanism of claim 17 in which the structural member is hollow and consists of an angle member that has an upper leg extending downwardly and rearwardly from a forward edge and a lower leg extending upwardly and rearwardly from a forward edge, and in wihch the forward wall is arcuate and forwardly concave with its upper and lower edges secured to the forward edges of the angle member.*

*20. The unloading mechanism of claim 19 in which the hollow structural member includes an internal rib that is connected to the central portion of the forward wall and to the apex of the angle member.*

*21. In a silo having a generally cylindrical upright wall and a floor with a central opening, unloading mechanism comprising: supporting spider means in the central opening; a central support rotatably carried on the spider means above only the center part of the opening so that most of the opening is unobstructed; means for rotating said support in a predetermined direction; a radial helical conveyor having a shaft the inner end of which is journalled in the central support and the outer end of which is adjacent the silo wall; supporting means adjacent the silo wall; means journalling the outer end of the conveyor shaft in said supporting means so that the bottom of the helical conveyor is in close, substantially parallel relationship to the floor; a sweep arm having a forward wall that faces generally in said predetermined direction in close, spaced relationship to the rear of the helical conveyor, said wall having an upper portion that overhangs the conveyor; securing means on said sweep arm fixedly securing it to the central support and to the supporting means, said securing means being so positioned as to afford no obstruction to the movement of material from the supporting means into the central opening; means on the supporting means for moving material from adjacent the side wall into the path of the helical conveyor; and means for driving the helical conveyor to move material into the central opening.*

*22. The unloading mechanism of claim 21 in which the sweep arm is a hollow structural member which includes a forwardly open angle member having two legs the margins of which are integrally connected to the rear of the forward wall.*

*23. The unloading mechanism of claim 22 in which the forward wall is arcuate, a first leg of the angle member extends downwardly and rearwardly from the upper*

*margin of said forward wall and a second leg of the angle member extends upwardly and rearwardly from the lower margin of said forward wall.*

*24. The unloading mechanism of claim 21 in which the sweep arm is a structural member that includes a separate top wall which extends downwardly and rearwardly from the upper portion of the forward wall.*

*25. In a silo having a generally cylindrical upright wall and a floor with a central opening, unloading mechanism comprising: a radial sweep auger adjacent the floor, said auger having an inner end over the opening and having an outer end immediately adjacent said upright wall; means supporting and journalling the outer end of the sweep auger, said means being between the auger and at least a part of said wall and holding the sweep auger above the floor; cutting knives on the auger which extend generally radially from its axis of rotation and have cutting edges that are slightly spaced from the floor; material displacing means on said supporting means; means for propelling the supporting means along the wall for displacing material into the path of the sweep auger; means for rotating said sweep auger for conveying the ensilage to the opening; and interengaging means on the silo wall and on the supporting means which cooperate to limit upward movement of a sweep arm.*

*26. The unloading mechanism of claim 25 in which the interengaging means includes a sprocket wheel on the supporting means and a racklike means on the silo wall, said sprocket and racklike means providing a part of the means for rotating the sweep auger.*

References Cited by the Examiner

The following references, cited by the Examiner, are of record in the patented file of this patent or the original patent.

UNITED STATES PATENTS

| | | | |
|---|---|---|---|
| 1,275,558 | 8/18 | Holmgren. | |
| 2,029,923 | 2/36 | Herbert | 104—279 |
| 2,592,559 | 4/52 | Graham et al. | |
| 2,711,814 | 6/55 | McCarthy. | |
| 2,794,560 | 6/57 | Buschbom. | |
| 2,915,019 | 12/59 | Tieman | 104—279 |
| 2,969,156 | 1/61 | Miller et al. | |

FOREIGN PATENTS

| | | |
|---|---|---|
| 71,584 | 4/31 | Sweden. |

GERALD M. FORLENZA, *Primary Examiner.*

HUGO O. SCHULZ, *Examiner.*